Figure 5:
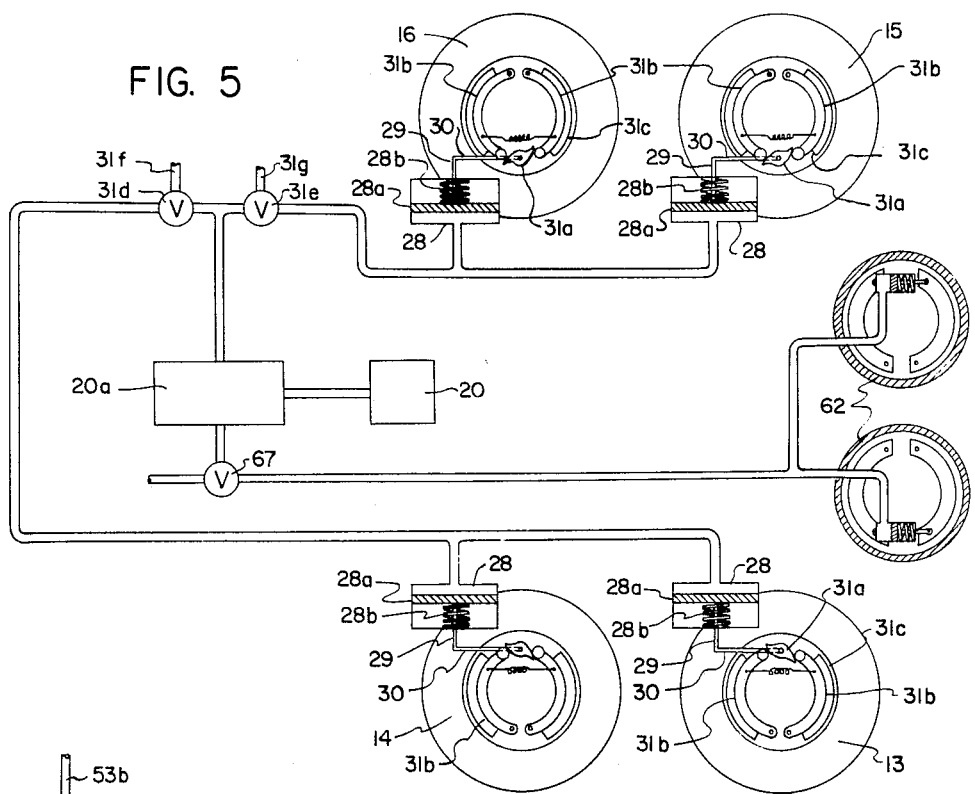

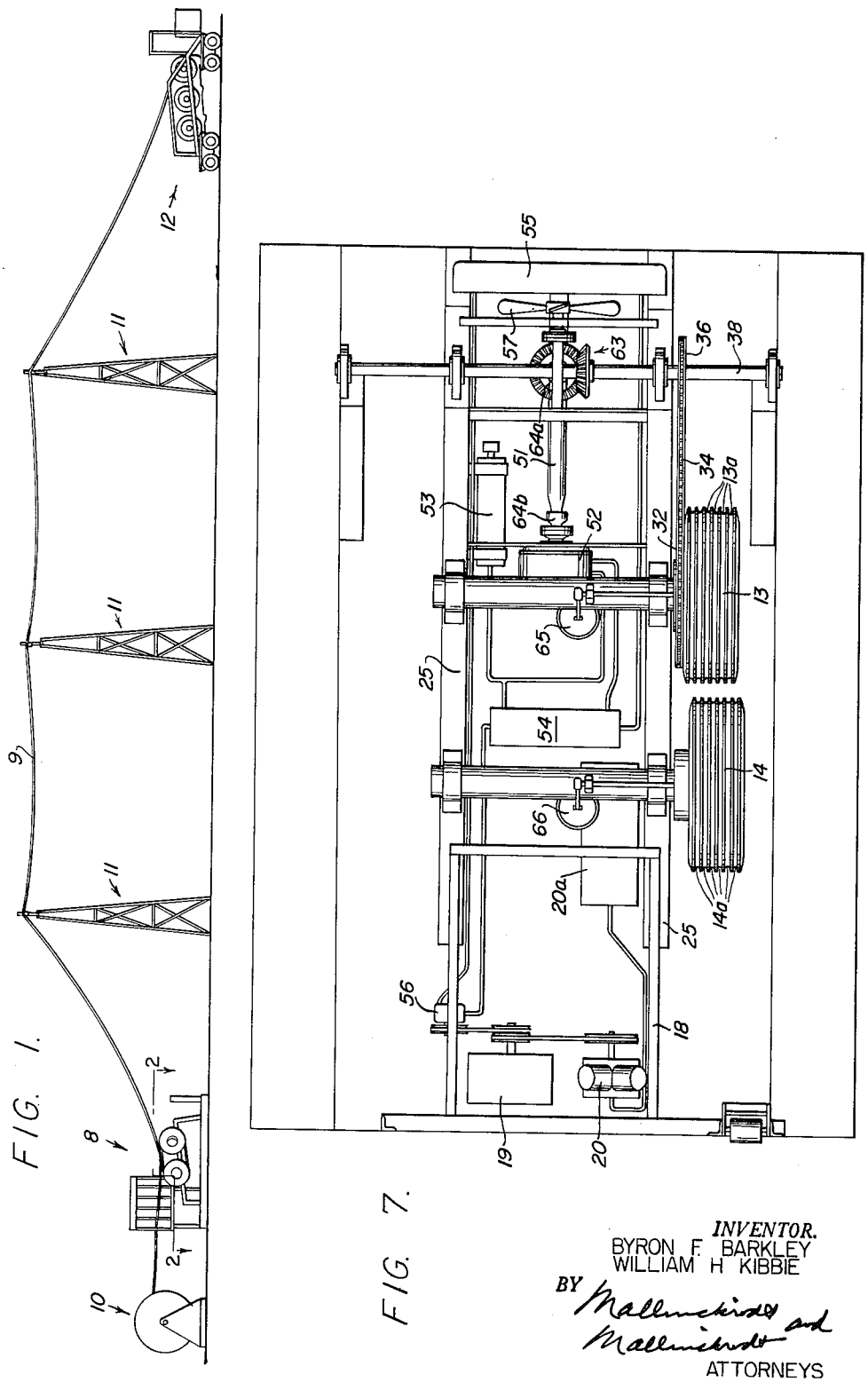

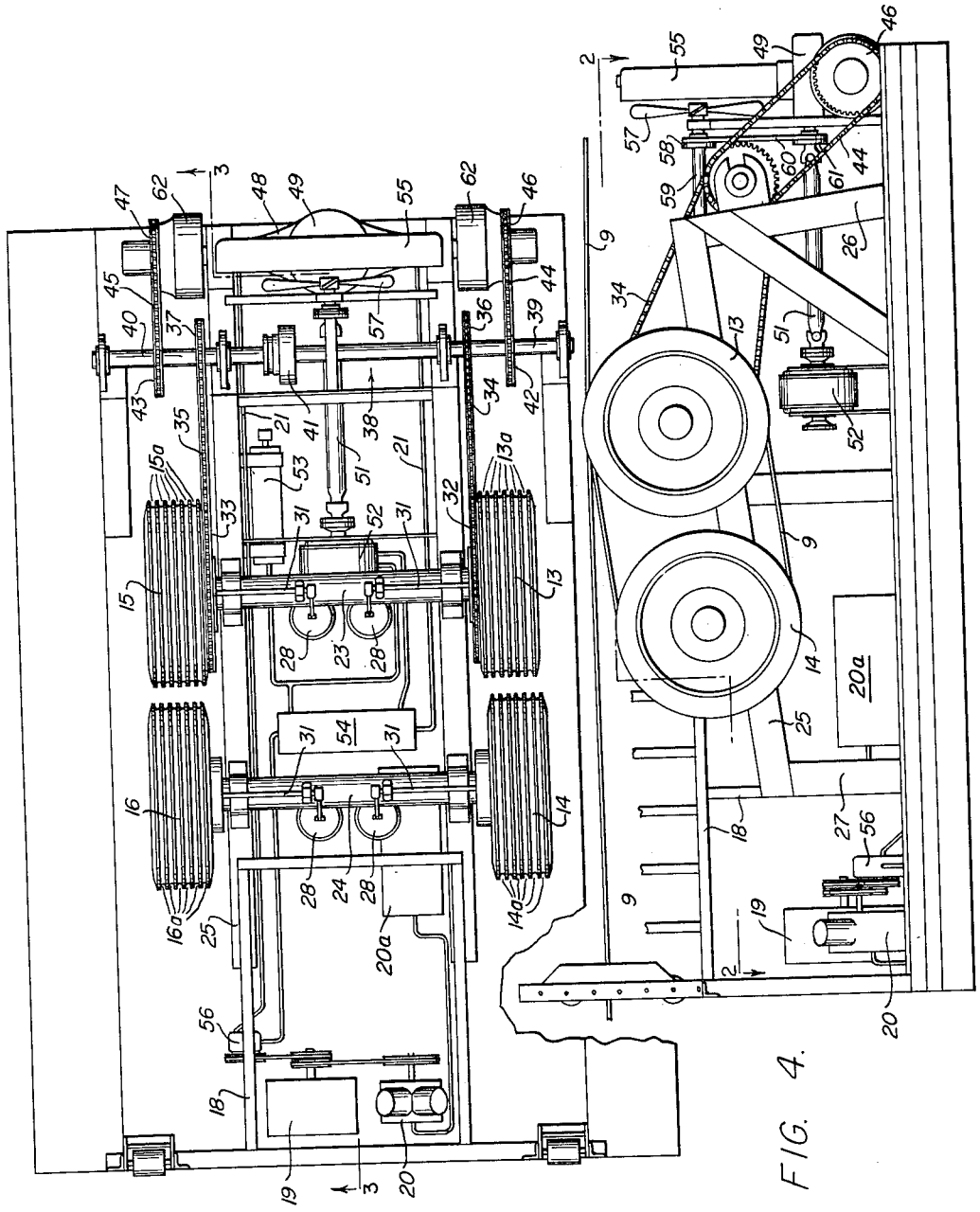

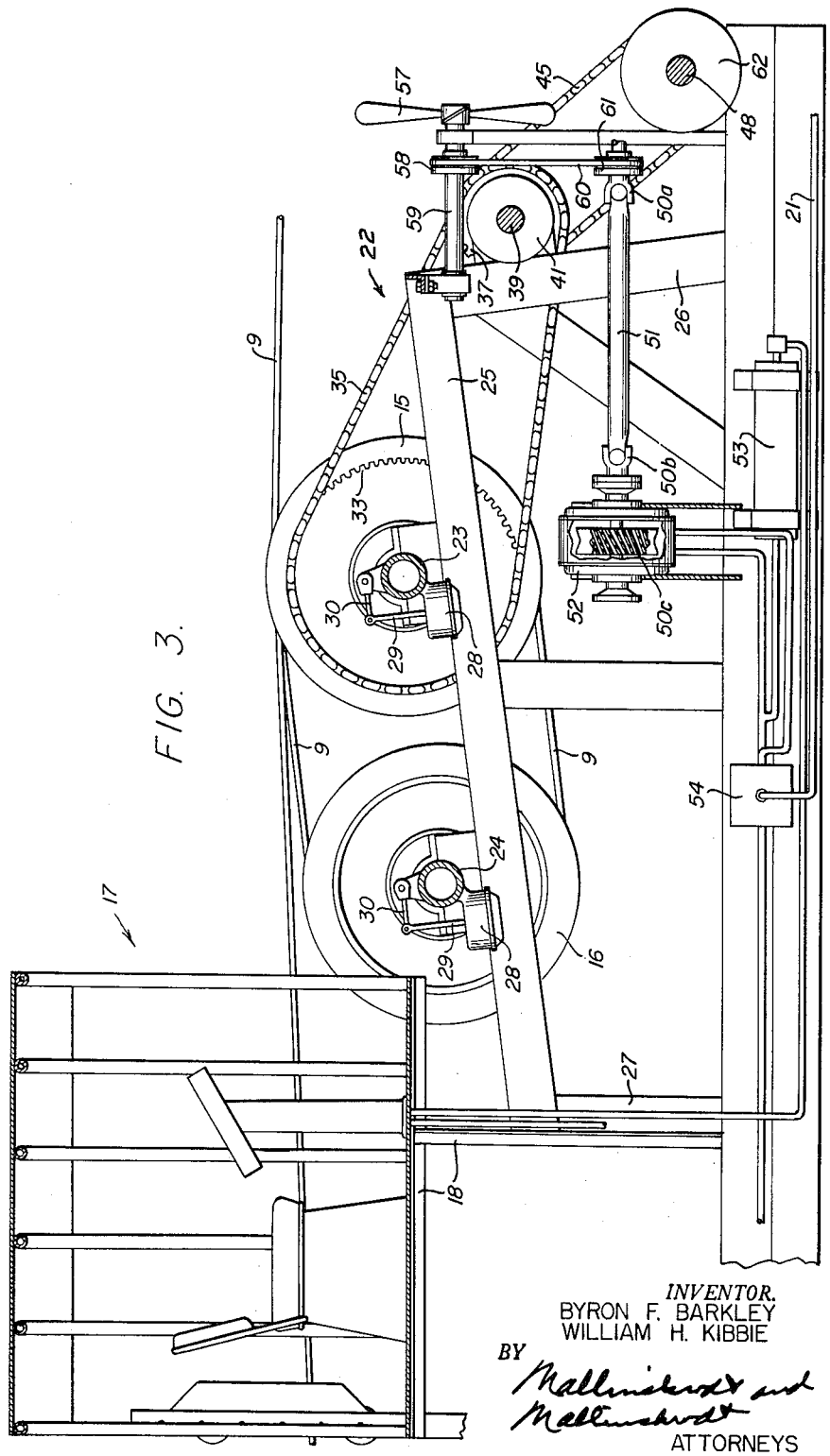

Feb. 1, 1966      B. F. BARKLEY ETAL      3,232,558
MACHINE FOR TENSIONING ELECTRICAL POWER LINES
Filed Feb. 1, 1963      4 Sheets-Sheet 4

INVENTOR.
BYRON F. BARKLEY
WILLIAM H. KIBBIE
BY
ATTORNEYS

United States Patent Office 3,232,558
Patented Feb. 1, 1966

3,232,558
MACHINE FOR TENSIONING ELECTRICAL
POWER LINES
Byron F. Barkley, and William H. Kibbie, both of
717 S. 4th W., Salt Lake City, Utah
Filed Feb. 1, 1963, Ser. No. 255,443
5 Claims. (Cl. 242—155)

This invention relates to machines for applying tension to electrical power lines as they are being strung between supporting poles or towers.

Wire for high tension electric power lines is made with a steel core surrounded by an aluminum sheath. If the aluminum sheath is scratched or scarred in any way, electric arcing is likely to occur. This will adversely affect radio and television signals. Moreover, damaging of the aluminum sheath may create coronas on the line, with resultant energy losses.

To prevent such injuries to the line as it is being strung, it is necessary that the wire be kept from sagging into contact with the ground, trees, building, or other foreign objects. This can best be accomplished by maintaining adequate tension on the wire at all times.

Electrical power lines are customarily strung by use of a so-called "puller" machine, which pulls the wire from a supply reel. As the wire comes off the reel, it is tightly wrapped around one or more bull-wheels of a tensioning machine before being connected to the puller. Pulling on the lead end of the wire applies a tangential force to the circumference of the bull-wheel and rotates it against a braking force applied to the bull-wheel. Conventional hydraulic or pneumatic brake systems are utilized for this purpose. These include brake drums and brake shoes lined with frictional material for engagement with the brake drums.

These conventional tensioning machines require almost constant observation and brake adjustments, as well as frequent relining of the brakes, for the load imposed on the bull-wheel and the speed of rotation during power line stringing are tremendous. Moreover, because of rapid wear of brake linings and frequent brake failures, it has heretofore been virtually impossible to maintain a constant tension on the line.

A principal object in the making of this invention was to provide an improved machine for paying out a wire or cable, especially an electrical power line, from a supply reel, so that a substantially constant tension of desired degree will be maintained on the wire or cable and so that the operation will not be interrupted by the need for adjustment or repairs.

Another object was to provide a machine capable of simultaneously paying out a pair of wires or cables and of maintaining the same desired tension on both, with provision for regaining the tension in either line should it be lost, without stopping the stringing operations.

The machine provided by this invention combines with the usual bull-wheel or wheels a rotor adapted to revolve in a liquid-filled reservoir. The rotation is countered by resistance of the liquid, usually oil, and this resistance or drag force is transmitted directly back to the bull-wheels to retard rotation thereof, without frictional engagement of any wear surfaces. Although considerable heat is generated by this resistance to rotation, it is quickly and harmlessly dissipated by passing the liquid through a heat exchanger.

For changing the tension applied to the line, a loading cylinder is utilized to regulate the amount of oil or other liquid in the hydraulic reservoir. Changes in volume of oil in the reservoir will vary the extent of drag exerted on the rotor and hence the resistance to rotation of the bull-wheels.

The tension can be precisely adjusted merely by controlling air pressure applied at the rear of the loading cylinder, since this pressure serves to force oil into the retarder in an amount proportionate to the amount of pressure applied. As the air pressure is reduced, oil is withdrawn from the retarder housing and returned to the cylinder.

In one embodiment of the invention, a plurality of bull-wheels are arranged for simultaneously tensioning two wires or cables. In this embodiment, in addition to a friction brake assembly as usually provided on line-tensioning machines, and a retarder of the type indicated for slowing the speed of rotation of the bull-wheels without the wearing of friction surfaces, clutch means are provided for enabling the same constant tension to be maintained on both lines and for cooperating with the friction brakes on the bull-wheels to regain the tension, should it be lost in either one or the other wheel, without necessitating stopping of wire-stringing operations.

Machines of the invention have enabled the uninterrupted stringing of either one or two electric power lines at a rate of 350 feet per minute, with constant tension, as compared with a usual rate of 200 feet per minute accompanied by undesirable variations in tension and intermittent shut downs for inspection, adjustment, and repairs.

There are shown in the accompanying drawings specific embodiments of the invention representing what are presently regarded as the best modes of carrying out the generic concepts in actual practice. From the detailed description of these presently preferred forms of the invention, other more specific objects and features will become apparent.

Figure 6:
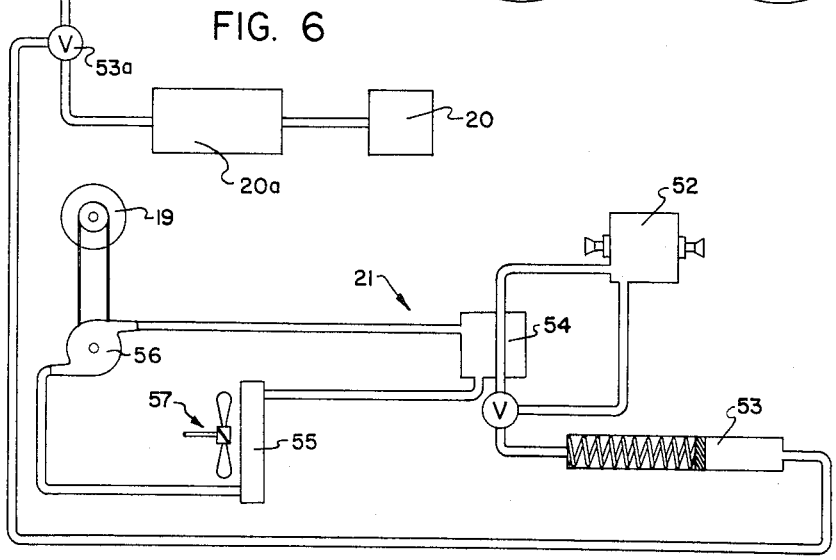

In the drawings:

FIG. 1 is a schematic view showing a machine of the invention in operation, along with a conventional puller, stringing a pair of electrical power lines simultaneously;

FIG. 2, a horizontal section taken on the line 2—2 of FIG. 1 and drawn to a considerably larger scale;

FIG. 3, a longitudinal vertical section taken on the line 3—3 of FIG. 2, a minor portion being broken out for convenience of illustration and the view being drawn to a somewhat larger scale than FIG. 2;

FIG. 4, a side elevation;

FIG. 5, a schematic representaion of the brakes and control means therefor of the tensioning machine shown in FIGS. 2–4;

FIG. 6, a schematic representation of the hydraulic circuit for the retarder shown in FIGS. 2–4; and FIG. 7, a view corresponding to that of FIG. 2, but showing a version of the machine designed for use in the stringing of a single line.

Referring now to the drawings:

The machine 8 of the invention is shown in FIG. 1 in use, tensioning a pair of electrical cables simultaneously as they are pulled from a pair of supply reels 10 and in side-by-side parallel relationship over supporting towers 11 by a conventional puller machine 12.

During the stringing operation, the machine 8 imposes a retarding force on the lines 9 against the pull of machine 12, so that the lines will be tensioned and will remain high on the towers out of harm's way.

In the form of the invention illustrated in FIGS. 2–4, the tensioning machine 8 comprises two sets of tandemly mounted, rubber-covered, grooved bull-wheels 13–16, about which respective lines 9 are wrapped, and a control cab 17 mounted on a platform 18 above and behind the bull-wheels. There is also a motor 19, an air compressor 20 including pressure tank 20a, a cooling system—shown generally at 21, and a motion transmitting and retarding assembly—shown generally at 22.

A person operating tensioning machine 8 will sit or stand in the cab and will have a clear view of the entire operating mechanism. Particularly, he can see whether or not the cables are properly tensioned and are otherwise properly passing around and off the bull-wheels. Control means for the entire machine are advantageously located in the cab for convenient manipulation by the operator.

The bull-wheels are arranged in tandem pairs 13, 14 and 15, 16 at respectively opposite sides of the machine. They are independently rotatable. Those in front, 13 and 15, are rotatably mounted on an axle 23 and those in the rear, 14 and 16, are rotatably mounted on an axle 24. The electrical cables 9 are wrapped around the bull-wheels of the respective sets in the grooves, 13a–16a thereof, before being passed to the supporting towers 11 and the puller machine 12.

The axles are supported on frames 25 having front legs 26 longer than the rear legs 27. This allows the cables to be pulled off the bull-wheels in substantially straight lines toward the tops of the towers, without binding but with maximum frictional engagement between the cables and the wheels.

A conventional air-brake assembly is provided for each bull-wheel. It includes a pressure chamber 28 and force-transmitting arms 29, 30, and 31, cams 31a fixed to arms 31, and lined brake shoes 31b normally biased away from a friction brake drum 31c associated with each wheel. The brakes of each tandem pair of wheels are operated simultaneously through control valves 31d and 31e located in the control cab 17. Thus, control valve 31d can be positioned to either supply air from pressure tank 20a of compressor 20 simultaneously to the air brake assemblies of wheels 13 and 14, or to prevent flow from the compressor to these air brake assemblies while exhausting air from them through conduit 31f. Similarly, valve 31e controls simultaneous flow of air to the air-brake assemblies of wheels 15 and 16 and exhaust from these assemblies through conduit 31g. Air supplied to the pressure chambers 28 acts on pistons 28a, overcoming the biasing effect of springs 28b, to raise arms 29 and pivot arms 31. This rotates cams 31a to force the pairs of pivoted, lined, brake shoes, shown spring biased towards each other, away from each other and into engagement with brake drums 31c, thereby braking their associated wheel.

Fixed to front bull-wheels 13 and 15 are respective sprockets 32 and 33. These could be fixed to the rear wheels, since each pair of wheels rotate together as the cable passes over them, but they are conveniently positioned as shown.

Rotary motion imparted to the bull-wheels by the cables 9 as they are pulled is transmitted by sprockets 32 and 33 to chains 34 and 35, and by these to sprockets 36 and 37 fixed on a jack shaft 38.

Jack shaft 38 is formed in two sections, 39 and 40, with a clutch assembly 41 therebetween. Thus, when the clutch is engaged, the two sets of wheels will rotate together at the same speed, but, when the clutch is disengaged, each set can rotate independently of the other.

Rotation of the two sections of the jack shaft, whether or not clutch 41 is engaged, is transmitted through sprockets 42 and 43, and chains 44 and 45 to a set of sprockets 46 and 47, which are fixed to brake housings of a conventional differential axle 48 having a differential unit 49 mounted thereon.

As either or both sprockets 46 and 47 are rotated, the differential axle feeds rotary motion through the differential unit 49 to a universal joint 50a, drive shaft 51, second universal joint 50b, and a vaned rotor 50c of a hydraulic retarder unit 52. Such hydraulic retarder unit is conveniently of standard type procurable in the open market. For example, it may be either an "Axle-Mount" or "Mid-Mount" model of the unit manufactured by Thompson Products Co., Michigan Division, Warren, Michigan, and should include a loading cylinder 53 for varying the drag resistance created by the rotor.

In operation, air is supplied to or exhausted from the rear of the loading cylinder from compressor 20, through a manually operable supply and exhaust valve 53a positioned in the control cab. As air is applied to the cylinder, oil is forced from the cylinder into the retarder unit, the amount transferred being directly proportional to the air pressure applied. The more oil transferred to the retarder housing, the greater will be the resistance to turning of the rotor 50c and the greater the braking force that will be imparted to the bull-wheels. As air is exhausted from the rear of the loading cylinder 53, through valve 53a and conduit 53b, the oil in the retarder unit is withdrawn into the cylinder, and the rotor meets less resistance to rotation.

Because considerable heat is generated by rotation of the rotor in the oil, some means to dissipate the heat is required. For this purpose, a heat exchanger 54 is provided, through which both the hot oil from the retarder housing and a cooling medium, preferably water, are circulated. The coolant is continuously circulated from radiator 55, where it is cooled, to the heat exchanger and then back to the radiator via a pump 56 driven by the motor 19.

Cooling of the water is accomplished by a fan 57, driven by a pulley 58 fixed to a rotatably mounted fan shaft 59, by a V-belt 60, and by a pulley 61 fixed to the universal joint 50a. Thus, whenever either set of bull-wheels is rotated by pulling the proper electric cable 9 around and off it, the motion is transmitted through the connecting sprockets and chains to the jack shaft 38, differential axle 48, universal joints 50a and 50b, pulley 61, V-belt 60, and pulley 58, to rotate the fan and blow cooling air through the radiator.

Mounted in a brake housing 62 on the differential axle are conventional, friction type, air brakes, which are utilized in conjunction with the hydraulic retarder unit 52 should it be desired to entirely stop the operation of the machine. In accomplishing this, the control valve 53a is actuated to supply enough air pressure to the loading cylinder to force all of the oil from the loading cylinder into retarder housing. This will create maximum resistance to rotation of the rotor 53c and tend to brake the bull-wheels. At the same time, the control valve 67 for the air brakes on the differential axle is operated to actuate the brakes, thereby assisting the retarder in braking and quickly and entirely stopping rotation of the bull-wheels.

If for any reason slack should develop in either line, as for example due to slippage of one of the cables 9 about its set of bull-wheels, it is only necessary that the clutch be disengaged and the appropriate set of brakes be operated. This will slow rotation of these bull-wheels until tension has been equalized, at which time the clutch will again be engaged, the sets of bull-wheels will rotate together, and the tension on both lines will be the same. These adjustments can be made without stopping the cable-stringing operation, as is required with conventional cable tensioning machines.

As previously explained, the controls for starting and regulating the motor which drives the air compressor and the water pump are not shown in detail, but they are positioned in the control cab. These, along with manual controls for the air brakes, the clutch, and the loading cylinder for the retarder are but conventional arrangements for controlling these respective components and, in themselves, are not inventive.

Similarly, details of the clutch assembly, air brakes, differential, and the retarder, are not shown, since they are readily available commercially and do not, per se, constitute inventive subject matter.

In the embodiment of the invention shown in FIG. 7, the line tensioning machine is arranged for stringing a single cable. Thus, only one set of tandem wheels 13 and 14 are provided. Rotation of these wheels is transmitted through sprocket 32, chain 34, sprocket 36 fixed to unitary jack shaft 38, standard right angle drive unit 63, universal connection 64a, drive shaft 51, and universal connection 64b to a rotor of a retarder assembly identical to that used in connection with the previously described machine.

As in the machine, conventional air brakes 65 and 66 are provided for each of the tandem wheels, and these will operate in unison in response to actuation of a single supply and exhaust control valve 31d. Since only one set of bull-wheels are provided and only one cable can be placed at a time, it is no longer necessary to correlate tension. Accordingly, it is no longer necessary to have a clutch assembly, two braking systems for two tandem sets of bull-wheels, or a third braking system operable from a single control valve to stop or assist the retarder in stopping bull-wheel rotation. In this modification, the latter function is performed by the air brakes 65 and 66 on the tandem bull-wheels.

In the operation of this latter embodiment, a single cable from a reel is tightly wrapped around the tandemly arranged bull-wheels, passed to the towers upon which it is to be placed, and terminated at a puller machine. Pulling on the cable will rotate the bull-wheels 13 and 14 and, through sprocket 32, chain 34, sprocket 36, jack shaft 38, right angle drive unit 63, universal joint 64a, drive shaft 51, universal joint 64b, will rotate the rotor of hydraulic retarder 52.

As in the previously described embodiment, rotation of the rotor is resisted by oil in the retarder, the amount of resistance being determined by the amount of air pressure applied to the back side of loading cylinder 53. This resistance is transmitted directly back to the bull-wheels and acts to slow rotation whenever the pulling force is reduced, thereby maintaining tension on the wire. The loading cylinder functions, and heat is dissipated from the retarder, as in connection with the first embodiment.

Although both embodiments have been disclosed as utilizing sprockets and chains as drive means for transmitting rotation and the retarding force developed, it should be obvious that other drive assemblies, as for example, pulleys and belts, or gear arrangements, could be used instead.

Machines constructed in accordance with the invention are capable of stringing electric power lines at considerably greater tensions and considerably greater speeds than heretofore. This enables the successful stringing of electric power lines at less height above the ground and with longer spans between supporting towers. Because of this, considerable economies are achieved and total costs for power line construction are lower.

The machine was developed for use in the stringing of a 600 mile long electric power line for the Arizona Public Service Company between Farmington, New Mexico and Phoenix, Arizona, where the line was designed to carry 345,000 volts. For the sake of economy, customary tower height was reduced by approximately 10 percent and the span between adjacent towers was increased by approximately 30 percent.

Conventional tensioning machines used initially were highly unsatisfactory, When replaced by machines of the invention, stringing of the power lines proceeded difficulty at an average rate of approximately 350 feet per minute and at an average pulling tension of approximately 20,000 pounds.

Whereas there are here illustrated and specifically described certain preferred constructions of apparatus which are presently regarded as the best modes of carrying out the invention, it should be understood that various changes may be made and other constructions adopted without departing from the inventive subject matter particularly pointed out and claimed herebelow.

We claim:

1. A cable tensioning machine comprising: two sets of tandemly arranged, rotatably mounted, bull-wheels, the front wheels of each set being rotatable about a front axle and the rear wheels of each set being rotatable about a rear axle, each set being adapted to have a cable to be tensioned tightly passed therearound; a two piece jack shaft interconnected by a clutch means, each piece of said jack shaft being rotatably mounted; means to transmit rotary motion of one set of bull-wheels to one piece of the jack shaft; means to transmit rotary motion of the other set of bull-wheels to the other piece of the jack shaft, said pieces of the jack shaft and the two sets of bull-wheels rotating in unison when said clutch means is engaged, but each set of bull-wheels and their associated piece of jack shaft being rotatable independently of the other bull-wheels and jack shaft when said clutch means is disengaged; a differential axle having a differential unit thereon; means transmitting rotary motion of one piece of said jack shaft to said axle at one side of said differential unit; means transmitting rotary motion of said other piece of the jack shaft to the axis at the opposite side of said differential unit; a drive shaft connected to said differential unit, rotation of said axle being transmitted through said differential unit to the drive shaft; a hydraulic retarder assembly including a rotor connected to said drive shaft, a housing in which said rotor rotates, and a loading cylinder connected to said housing to supply and exhaust hydraulic fluid thereto in proportion to air pressure applied to the cylinder; a source of air pressure, control means regulating the pressure applied from said source to said cylinder; a heat exchanger; means interconnecting said heat exchanger with said housing so that hydraulic fluid will be circulated therethrough; a radiator; means interconnecting said heat exchanger with said radiator so that coolant liquid in said radiator will be circulated therethrough; a rotatably mounted fan, positioned to circulate air through said radiator; and drive means connecting said fan to said drive shaft for rotation therewith.

2. The cable tensioning machine of claim 1, wherein friction brake means are provided for each bull-wheel, and separate control means are provided to actuate the brakes of each set simultaneously.

3. The cable tensioning machine of claim 2, wherein friction brake means are additionally provided on said axle to control rotation thereof, and control means are provided for said brakes.

4. A cable tensioning machine, comprising: two sets of tandemly arranged, rotatably mounted bull-wheels, each set being adapted to have a cable to be tensioned tightly passed therearound; a two-piece jack shaft interconnected by a clutch means, each piece of said jack shaft being journaled for axial rotation; means to transmit rotary motion of one set of bull-wheels to one piece of the jack shaft; means to transmit rotary motion of the other set of bull-wheels to the other piece of the jack shaft, said pieces of the jack shaft and the two sets of bull-wheels rotating in unison when said clutch means is engaged, but each set of bull-wheels and their associated piece of jack shaft being rotatable independently of the other bull-wheels and jack shaft when said clutch means is disengaged; a differential axle having a differential unit thereon; means transmitting rotary motion of one piece of said jack shaft to said axle at one side of said differential unit; means transmitting rotary motion of said other piece of the jack shaft to the axle at the opposite side of the differential unit; a drive shaft connected to said differential unit, rotation of the axle being transmitted through said differential unit to the drive shaft;

and means providing a predetermined resistance force to movement of the drive shaft.

5. A cable tensioning machine comprising: a plurality of sets of tandemly arranged, rotatably mounted bull-wheels, each set being adapted to have a cable to be tensioned passed therearound; friction brake means for each wheel; control means for simultaneously operating the brakes of each set independently of the brakes of the other sets; a common drive shaft; brake means for selectively retarding rotation of said common drive shaft; and means adapted to selectively transmit rotary motion of each of said sets of bull-wheels to said common drive shaft, said means being adapted to disengage said common drive shaft from said bull wheels when a driving force is not being applied to the wheels.

References Cited by the Examiner

UNITED STATES PATENTS

| 2,947,494 | 8/1960 | Merritt | 242—156 |
| 2,948,483 | 8/1960 | Petersen | 242—156 X |
| 2,963,118 | 12/1960 | Booth et al. | 188—90 |
| 3,054,572 | 9/1962 | Williams et al. | 242—86.7 |

FOREIGN PATENTS

| 703,919 | 2/1954 | Great Britain. |
| 868,968 | 5/1961 | Great Britain. |

MERVIN STEIN, *Primary Examiner.*

RUSSELL C. MADER, *Examiner.*